A. HAMILL.
SAND VALVE OR STRAINER.
APPLICATION FILED FEB. 24, 1913.
1,078,674.
Patented Nov. 18, 1913.
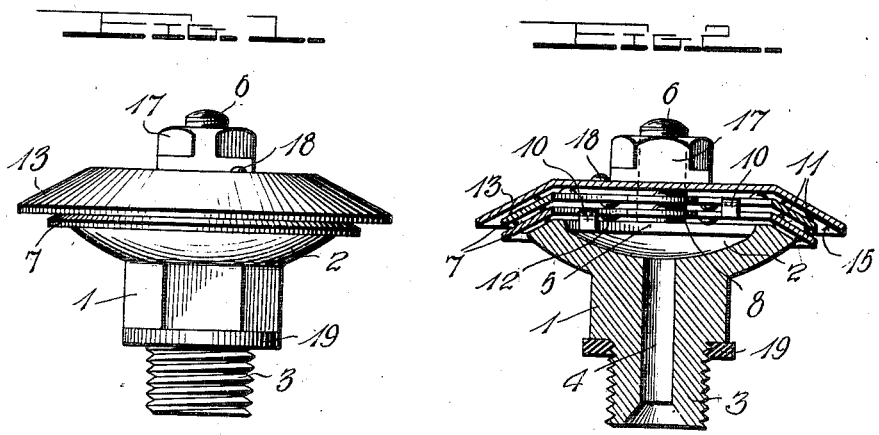
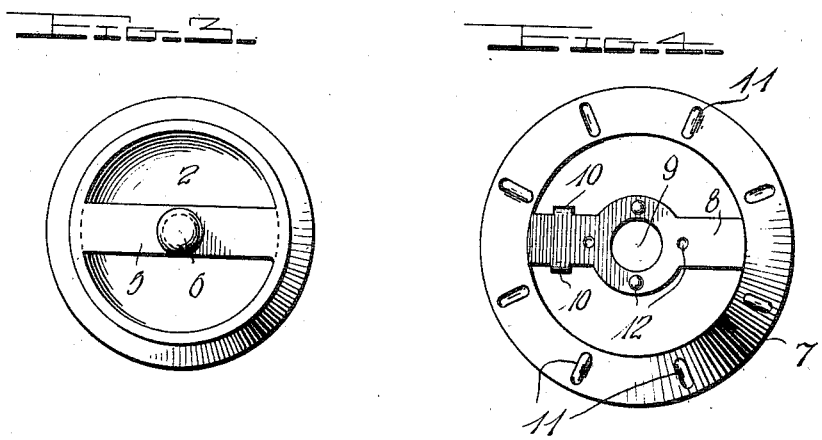
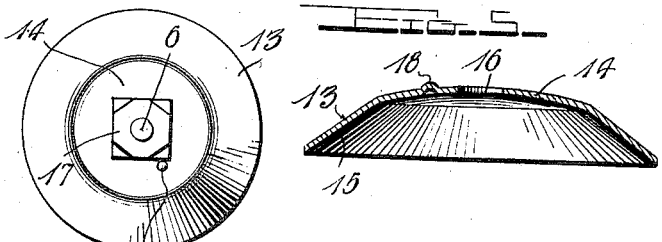
Witnesses
Inventor
Alexander Hamill,
By H. B. Willson & Co.
Attorneys

UNITED STATES PATENT OFFICE.

ALEXANDER HAMILL, OF BALTIMORE, MARYLAND.

SAND VALVE OR STRAINER.

1,078,674.

Specification of Letters Patent.   Patented Nov. 18, 1913.

Application filed February 24, 1913.   Serial No. 750,402.

*To all whom it may concern:*

Be it known that I, ALEXANDER HAMILL, a citizen of the United States, residing at Baltimore, in the State of Maryland, have invented certain new and useful Improvements in Sand Valves or Strainers; and I do declare the following to be a full, clear, and exact description of the invention, such as will enable others skilled in the art to which it appertains to make and use the same.

This invention relates to improvements in sand valves or strainers for water filters, and more particularly the one covered by U. S. Patent No. 990,861 granted to me May 2, 1911.

The object of the present invention is to improve and simplify the construction of the device whereby the parts may be produced and assembled at less expense and the entire device rendered more efficient and reliable in operation.

With this and other objects in view, the invention consists of certain novel features of construction, and the combination and arrangement of parts as will be hereinafter more fully described and claimed.

In the accompanying drawings;—Figure 1 is a side view of my improved valve or strainer; Fig. 2 is a vertical section thereof; Fig. 3 is a plan view of the base member of the valve; Fig. 4 is a similar view of one of the water deflecting disks; Fig. 5 is a central vertical section of the combined outer water deflecting plate and cap illustrating the shape of the same before being clamped onto the other deflecting plates or disks of the valve. Fig. 6 is a top plan view of the complete valve.

Referring more particularly to the drawing, 1 denotes the base or attaching member of my improved valve or strainer, said base having on its upper end a concaved or cup shaped annular flange 2 the upper edge of which is beveled or inclined outwardly and downwardly as shown. The body of the base below the flange 2 is preferably of squared or hexagonal form to permit the application of a wrench, while the lower end of the base is reduced to form a cylindrical nipple 3 which is exteriorly threaded and is designed to be screwed into a threaded aperture in the bottom of the filter or other object to which the same is applied.

The base 1 is provided with a centrally disposed bore or water passage 4 the upper end of which communicates with the space in the cup-shaped flange 2 while the lower end of said passage is preferably flared as shown. Arranged transversely across the center of the flange 2 and formed integral therewith is a stud supporting bar 5 on which is formed an upwardly extending threaded disk supporting stud 6.

Engaged with the stud 6 are a series of circular water deflecting plates or disks 7 which are disposed one above the other in spaced relation. Each of the plates or disks 7 comprises an annular downwardly and outwardly inclined ring in which and formed integral with the inner edge thereof is a transverse attaching bar 8 having an enlarged central portion provided with an aperture 9 adapted to receive the stud 6. In assembling the plates or disks the bars 8 are disposed in line one above the other and above the cross bar 5 of the base. On the cross bars 8 of the plates or disks are formed depending parallel stop lugs 10. The lugs 10 of the lower plate or disk 7 are engaged with the opposite sides of the cross bar 5 of the base member while the lugs 10 of each successive plate or disk are engaged with the bar 8 of the next lower plate, said lugs of each successive plate being disposed on opposite sides of the central enlarged portions of the bars as shown, so that when the plates or disks are assembled, the lugs of one disk will not interfere with the lugs of the adjacent disks. By providing the lugs 10 and arranging the same as herein shown and described it will be seen that the plates or disks will be held against rotation on the stud 6 and base of the valve.

The plates or disks 7 are spaced uniform distances apart and from the beveled or inclined edge of the flange 2 on the base by spacing studs or detents 11 which project from the plates and are preferably formed by punching or indenting the material from which the plates are formed, said indented portion of the material projecting beyond the upper and lower surfaces of the rings to a sufficient extent to form the desired spaces between the plates. The cross bars 8 of the plates are also indented from opposite sides to form upwardly and downwardly projecting detents or spacing studs 12 which engage the cross bars of the next adjacent plates and hold the bars in the same spaced relation as the rings or outer portions of the plates, as clearly shown in Fig. 2 of the drawing.

The uppermost deflecting member of the valve is a disk 13 in the form of a cap or central portion 14 and an integral downwardly inclined deflecting flange 15. The flange 15 is in the shape of a ring of greater width than the rings of the plates 7 and when arranged above said plates 7, projects a suitable distance beyond the outer edges thereof, this projecting portion of the ring 15 protecting the edges of the plates or disks beneath the same. The central portion or cap has therein a centrally disposed aperture 16 to receive the stud 6 and it will be noted by reference to Fig. 5 of the drawings that the central portion 14, before this member is placed in position on the valve, is slightly convexed or bulges upwardly while the flange 15 on the outer edge thereof is contracted or drawn inwardly to a slightly greater angle than when in an operative position. The member 13 is constructed in this manner so that when placed on the stud 6 and in engagement with the plates or disks 7 and forced downwardly or compressed the clamping nut 17 which is screwed onto the projecting upper end of the stud, the convexed portion of the member will be flattened while the flange 15 will be spread or expanded so that said member 13 will exert a yielding pressure or tension on the spacing studs or detents of the upper disk 7, thus holding said disks in position on the base member of the valve. This arrangement of the member 13 will also cause the same to exert a uniform pressure on the parts of the plates or disks 7 when the nut 17 is screwed downwardly to an operative position on the stud 6.

In order to prevent the casual unscrewing of the nut 17 from the stud, I preferably provide the member 13 with a nut locking projection 18 which is preferably formed by indenting the portion 14 of said member at one or more points, preferably so as to engage one corner of the nut as shown. In thus arranging the projection 18 the nut 17 when screwed down into engagement therewith will spring the metal downwardly until the corners of the nut have cleared said projection whereupon the resiliency of the metal will cause the projection to spring upwardly into engagement with the side of the nut, thus preventing the unscrewing thereof without force. Arranged on the reduced threaded end of the base 1 and engaged with the shoulder formed by said reduced end is a washer 19 which is preferably formed of a flat metal which when the base member of the valve is screwed into position will conform with any irregularities in the surface of the bottom of the filter or other object to which the valve is applied thus forming a tight connection for the base member of the valve without danger of injuring the threads of the connection.

In the operation of the strainer it will be seen that the water entering through the passage 4 in the base will flow freely through the open spaces in the deflecting plates or disks 7 and will be uniformly discharged from the spaces between said disks. The water when thus discharged will be deflected downwardly and outwardly from the valve or strainer without displacing the filtering material. By arranging the plates or disks and assembling the same as herein shown and described it will be seen that these plates may be readily removed when necessary without detaching the base member of the valve from the filter. This arrangement is particularly desirable in view of the fact that the base portion of the strainers or valves are frequently embedded in cement and cannot be readily removed. The arrangement of the detents varies on the deflecting plates or disks so that they are out of register, and they effectively prevent the edges of said disks from becoming jammed or pressed together and thus interfering with the free passage of the water through the spaces between the plates.

Various changes in the form, proportion and the minor details of construction may be resorted to without departing from the principle or sacrificing any of the advantages of the invention as claimed.

Having thus described my invention, what I claim is:

1. A valve of the class described comprising a tubular base, a flange around its upper end, a cross bar within the flange, a stud rising from the center of said bar, a series of spaced disks each consisting of a ring above said flange and a cross bar within the ring having a central aperture, an uppermost disk consisting of a normally convex central portion pierced with an aperture and a marginal inclined flange wider than said rings, means for spacing the disks, lugs depending in pairs from the edges of said cross bars, the lowermost pair engaging the cross bar of the body flange, the next pair above engaging the cross bar of the lowermost disk, and so on, and means for clamping the uppermost disk upon the others and all of them in position around said stud.

2. A valve of the character described comprising a tubular base, a flange around its upper end, a cross bar within the flange, a stud rising from the center of said bar, a series of disks each consisting of a ring above said flange and a cross bar within the ring having a central aperture, an uppermost disk consisting of a central portion pierced with an aperture and a marginal inclined flange, detents projecting from each cross bar and ring out of register with those in the next similar elements, lugs depending in pairs from the edges of said cross bars, the lowermost pair engaging the cross bar of the body flange, the next pair above engaging the cross bar of the lowermost disk, and so on, and means for clamping the uppermost disk upon the others and all of them in position around said stud.

3. A valve of the character described comprising a tubular base, a flange around its upper end, a cross bar within the flange, a threaded stud rising from the center of said bar, a series of spaced disks each consisting of a ring above said flange and a cross bar within the ring having a central aperture, an uppermost disk consisting of a normally convexed central portion pierced with an aperture and a marginal inclined flange wider than said rings, means for spacing the disks, means for preventing the rotation of one disk upon another around said stud, the uppermost disk having a projection rising therefrom adjacent its aperture, and a nut threaded onto the upper end of said stud and held in place by said projection.

In testimony whereof I have hereunto set my hand in presence of two subscribing witnesses.

ALEXANDER HAMILL.

Witnesses:
L. O. HILTON,
M. H. STUARD.